(12) United States Patent
Takamiya et al.

(10) Patent No.: US 7,736,515 B2
(45) Date of Patent: Jun. 15, 2010

(54) METHOD FOR TREATMENT OF DISTILLATION WASTE FROM STARCHY MATERIALS

(75) Inventors: Hiroshi Takamiya, Chiyoda-ku (JP); Shoichiro Kajiwara, Katsushika-ku (JP); Koji Hirukawa, Katsushika-ku (JP); Kimihisa Iwashiro, Katsushika-ku (JP)

(73) Assignees: Mitsubishi Gas Chemical Company, Inc., Tokyo (JP); Dia Aqua Solutions Co., Inc., Tokyo (JP)

( * ) Notice: Subject to any disclaimer, the term of this patent is extended or adjusted under 35 U.S.C. 154(b) by 191 days.

(21) Appl. No.: 12/015,764

(22) Filed: Jan. 17, 2008

(65) Prior Publication Data

US 2008/0173052 A1     Jul. 24, 2008

(30) Foreign Application Priority Data

Jan. 19, 2007    (JP) .......................... 2007-010577

(51) Int. Cl.
*B01D 15/00*    (2006.01)
*B01D 61/02*    (2006.01)
*B01D 61/04*    (2006.01)
*C05F 5/00*     (2006.01)
*A23L 1/09*     (2006.01)

(52) U.S. Cl. ................. 210/639; 71/11; 71/25; 71/26; 210/652; 210/727; 210/730; 210/733; 426/655

(58) Field of Classification Search ............ 210/639, 210/652, 727, 730, 733
See application file for complete search history.

(56) References Cited

U.S. PATENT DOCUMENTS

| | | | | |
|---|---|---|---|---|
| 4,119,538 | A | * | 10/1978 | Yamauchi et al. ...... 405/129.28 |
| 4,382,864 | A | * | 5/1983 | Hashimoto et al. ......... 210/727 |
| 7,037,433 | B2 | * | 5/2006 | Abu-Orf et al. ............. 210/709 |

FOREIGN PATENT DOCUMENTS

| JP | 58-58200 | * 10/1981 |
|---|---|---|
| JP | 2-11320 | 3/1990 |

* cited by examiner

*Primary Examiner*—Wayne Langel
(74) *Attorney, Agent, or Firm*—Nixon & Vanderhye P.C.

(57) ABSTRACT

There is provided a method for highly treating distillation waste generated in the process of separating a distilled alcoholic material after alcoholic fermentation of starchy materials. The method includes the steps of adding sodium polyacrylate to the distillation waste from the starchy materials, then adding chitosan to treat the distillation waste, and further adding sodium polyacrylate to the waste. Furthermore, solid-liquid separation is then carried out. A liquid material thus separated is brought into contact with a reverse osmosis membrane.

13 Claims, No Drawings

METHOD FOR TREATMENT OF DISTILLATION WASTE FROM STARCHY MATERIALS

FIELD OF THE INVENTION

The present invention relates to a method for treatment of distillation waste from starchy materials, and more particularly to a method for highly treating the distillation waste generated in the process for separating a distilled alcoholic component after alcoholic fermentation of starchy materials.

BACKGROUND OF THE INVENTION

In accordance with the trend of the present times toward promotion of the health, production of distilled liquors, especially Japanese distilled spirits (shochu) has been increasing. The distilled spirit, shochu, is produced by subjecting a raw material such as sweet potato, rice, barley or the like to alcoholic fermentation, and separating a fraction in distillation. In the step of separation, large amounts of distillation residues (hereinafter referred to as distillation waste) are generated. Also, in the manufacturing process of bioethanol for fuel, which mainly uses various starchy materials such as corn, sugar cane and the like as the raw materials, considerable distillation waste is generated similarly.

The distillation process based on alcoholic fermentation of raw materials such as the above-mentioned starchy materials has caused the problems in the treatment of considerable amounts of distillation waste generated. Conventionally, the distillation waste has been mostly discarded by dumping in the ocean, returning to the earth, incineration and the like. However, dumping of wastes into ocean is controlled under the "London Convention" and supposed to be completely prohibited. The method of returning the waste to the earth has produces the problems of pollution of groundwater and rivers; and the method of incineration has a problem in cost. In light of this, as an alternative to the conventional discarding methods, the establishment of a method for making effective use of the distillation waste, for example, as livestock feed, is considered to be a high priority.

Recycling of enormous amounts of the distillation waste as a solid feed, manure or the like can be realized if the distillation waste can be subjected to effective solid-liquid separation. Current methods for the solid-liquid separation include floatation, centrifugal separation, coagulation settling and the like. The water content of the distillation waste is usually 90 mass % or more and the viscosity thereof is high, so that the solid-liquid separation cannot be completely achieved by any of the above-mentioned current methods, or the separation is very difficult at the present stage. There is known a dewatering method for sludge using a cationic polymer coagulant and an anionic polymer coagulant (Japanese Patent Examined Publication (JP Kokoku) Hei 2-11320). Even though the process for the above-mentioned dewatering method is applied to the distillation waste of starchy materials, good results cannot be obtained.

SUMMARY OF THE INVENTION

In consideration of this, a first object of the present invention is to provide a method for efficiently carrying out the solid-liquid separation of the distillation waste at low cost, and in addition, a method for safely treating the solid material thus separated to yield a product suitable for feed.

A second object of the present invention is to provide a method for recovering organic matter from the liquid material separated through the solid-liquid separation according to the present invention to make effective use of the organic matter, while treating the remaining liquid to reuse it as water or dispose it as waste water with no difficulty.

The inventors of the present invention have intensively studied to achieve the above-mentioned objects. As a result, the present inventors have found that solid-liquid separation of the distillation waste can be carried out easily and satisfactorily by successively adding particular anionic polymer compounds and particular cationic polymer compounds in combination to the distillation waste.

Further, the inventors of the present invention have also found that the liquid material obtained by the solid-liquid separation according to the present invention can be passed through a particular separation membrane because removal of the solid material from the liquid material attains to such an extent that the liquid material can be readily subjected to subsequent microfiltration, thereby easily recovering the organic matter that remains in the liquid material.

Accordingly, the present invention provides the following treatment method for distillation waste from starchy materials:

(1) A method for treating distillation waste from starchy materials, comprising the steps of adding sodium polyacrylate to treat the distillation waste from the starchy materials, and then adding chitosan to treat the distillation waste treated in the first step, and further adding sodium polyacrylate to treat the waste treated in the second step.

(2) The method for treating distillation waste from starchy materials as described in the above-mentioned aspect (1), further comprising the steps of carrying out solid-liquid separation after the treatment by the addition of sodium polyacrylate in the third step, and bringing a liquid material separated into contact with a reverse osmosis membrane.

The present invention further provides a method for producing distillation waste having a reduced amount of water from starchy materials, comprising the steps of:

adding sodium polyacrylate to treat the distillation waste, adding chitosan to treat the distillation waste treated in the first step, and adding sodium polyacrylate to treat the distillation waste treated in the second step to obtain the distillation waste having a reduced amount of water.

The present invention yet further provides a feed or fertilizer comprising the distillation waste obtained according to the method described above.

According to the present invention, the solid-liquid separation can be achieved in a remarkably favorable manner after the treatment by addition of the additive agents. Any of the additives for use in the present invention are approved as highly safe when used as food additives and feed additives. In addition, the solid material obtained after the treatment can be utilized as feed.

Further, according to the present invention, the organic matter can be recovered to a high degree by bringing the liquid material into contact with a reverse osmosis membrane. At the same time, the water quality of the permeate liquid attains to such a degree that the permeate liquid can be reused as water for the process of fermentation or as wash water for washing various apparatus and the like, or disposed with no difficulty as general waste water.

DETAILED DESCRIPTION OF THE INVENTION

The distillation waste from starchy materials to be treated according to the present invention, which is not limited to the specific ones according to kinds of starchy materials as a raw material or a distillation method, includes distillation waste of Japanese distilled spirits (shochu), for example, distillation waste of imo-shochu (Japanese distilled spirits made from sweet potato), distillation waste of kome-shochu (Japanese distilled spirits made from rice), and distillation waste of mugi-shochu (Japanese distilled spirits made from barley), and distillation waste generated from the manufacturing process of bioethanol for fuel, for example, distillation waste generated from the manufacturing process of ethanol by fermenting biomass such as corn (maize), sugar cane, sugar beet, sorghum, potato, sweet potato or barley and distillating the fermented biomass.

Sodium polyacrylate and chitosan used in the present invention are respectively known as a synthetic anionic polymer coagulant and a natural cationic polymer coagulant. The above-mentioned agents produce little effect or the effect is insufficient when the two agents are merely added in combination to the distillation waste. The solid-liquid separation performance of the distillation waste is drastically improved by the three-step successive addition of sodium polyacrylate, chitosan, and sodium polyacrylate according to the present invention.

The above-mentioned JP Kokoku Hei 2-11320 describes that not only sodium polyacrylate, but also acrylamide-unit containing compounds such as a copolymer of sodium acrylate and acrylamide are also effective. In the three-step successive addition according to the present invention, however, those acrylamide-unit containing polymers are not useful because the treatment with those polymers does not produce a good effect. The effectiveness of synthetic cationic polymer coagulants is also mentioned in JP Kokoku Hei 2-11320, but such synthetic cationic polymer coagulants do not produce a good effect in the present invention.

Preferably used as the sodium polyacrylate in the present invention are polymeric products having a weight-average molecular weight of 1,000,000 or more, more preferably about 10,000,000, which are commercially available as the coagulant, thickener, additive for feed or the like. The upper limit of the molecular weight is not limited, but 20,000,000 or less is preferable. When the weight-average molecular weight of the sodium polyacrylate falls within the range defined above, the treatment effect can be maximized. The weight-average molecular weight of the sodium polyacrylate can be measured by a gel permeation chromatography (GPC).

In the present invention, it is preferable to use the sodium polyacrylate in the form of an aqueous solution in order to bring the sodium polyacrylate into full contact with the distillation waste to improve treatment efficacy or performance. In this connection, the aqueous solution may be prepared at a concentration of around 0.1 to 0.3% by mass.

The sodium polyacrylate may preferably have a viscosity at 25° C. of from 100 to 500 mPa·s in terms of 0.10% by weight of aqueous solution. When the viscosity falls within the range defined above the treatment effect can be maximized. The viscosity of sodium polyacrylate can be measured in the form of a water solution by a rotating viscometer, for example, a B-type viscometer.

The chitosan used in the present invention is easily available because there are industrially available products where 80% or more of chitin is deacetylated. Also, high-molecular chitosan are preferably used. The chitosan with a molecular weight of 1,000,000 or more (in terms of relative molecular weight based on bullulan by GPC) are preferable. The chitosan with a molecular weight of 2,000,000 to 6,000,000 are more preferable. The upper limit of the molecular weight is not limited, but 10,000,000 or less is preferable. When the weight-average molecular weight of the chitosan falls within the range defined above, the treatment effect can be maximized. The weight-average molecular weight of the chitosan can be measured by GPC.

In the present invention, it is preferable to use the chitosan in the form of an aqueous solution in order to bring the chitosan into full contact with the distillation waste to improve treatment efficacy or performance. In this connection, since the chitosan is insoluble to water, it is preferable to dissolve chitosan into an aqueous solution in the presence of around equal parts by mass of an acid such as hydrochloric acid to form an aqueous solution of around 0.2 to 1.0% by mass.

The chitosan may preferably have a viscosity at 25° C. of from 20 to 700 mPa·s in terms of 0.5% by weight of a solution. When the viscosity falls within the range defined above, the treatment effect can be maximized. The viscosity of chitosan can be measured in the form of 0.5% acetic acid solution by using by a rotating viscometer, for example, a B-type viscometer.

The sodium polyacrylate and the chitosan used in the present invention are successively added to the distillation waste in three steps. Namely, after the addition of sodium polyacrylate, chitosan is added, and then sodium polyacrylate is again added. The solid-liquid separation cannot be achieved satisfactorily by the two-step addition method where chitosan is just added after the addition of sodium polyacrylate or sodium polyacrylate is just added after the addition of chitosan.

Although the time interval between the successive steps of adding the agents is not particularly limited in the present invention, the agent previously added is at least required to become uniformly mixed into the system by stirring before the next addition. Generally, the time interval may preferably be at least 5 minutes or more, and up to about 60 minutes at maximum.

As a treatment means, stirring is preferable. As a stirring means, stirring by blades and the like are included. The stirring time is generally around 1 to 10 minutes.

The amounts of the sodium polyacrylate and chitosan added to the distillation waste should be determined depending upon the kind of starchy material as the raw material and the solid content in the distillation waste. The solid content in the distillation waste is commonly in the range of 2 to 6 mass % (water content of 98 to 94%). In light of this, the amounts of sodium polyacrylate added in the first step and the third step may individually be 10 to 1000 mg/kg, preferably 25 to 200 mg/kg. The amount of chitosan added to the distillation waste may be in the range of 10 to 1000 mg/kg, preferably 50 to 200 mg/kg. In most cases, the addition in an amount of more than 1000 mg/kg would not enhance the treatment effect to result in diseconomy. In most cases, the addition in an amount of more than 200 mg/kg will not improve the results.

According to the present invention, the distillation waste thus treated can become a large-sized hard floc, which is smooth and not sticky. The water content of the distillation waste according to the present invention is generally 80% or less. Therefore, the subsequent dewatering process by use of a centrifugal drier, vacuum drier or the like can be easily and efficiently carried out. Consequently, a solid material with a low water content can be obtained. A feed or fertilizer may be obtained from the distillation waste having a reduced amount of water according to a well-known technique in the art.

Furthermore, by bringing the liquid material obtained by the solid-liquid separation according to the present invention into contact with a reverse osmosis membrane, organic matter can be highly recovered. The organic matter derived from the distillation waste is usually contained in the separated liquid material in an amount of 1,000 to 10,000 mg/kg in terms of the COD value. Such organic matter can be efficiently recovered in the concentrate liquid by using the reverse osmosis membrane. The concentrate liquid thus obtained may be reused for livestock feed. In this case, the concentrate liquid may be used as it is or converted into a solid by evaporating the water component. On the other hand, depending upon the contact conditions with the reverse osmosis membrane, the permeate liquid through the membrane can be reused as water for fermentation process or water for washing various apparatus and the like. The water quality of the permeate liquid is acceptable even when the liquid is disposed as general waste water.

The reverse osmosis membrane used in the present invention is generally referred to as RO membrane. This membrane is not particularly limited so long as organic matter can be highly rejected. The industrially manufactured RO membranes made from polyamide, cellulose acetate and the like are applicable. The liquid material may be brought into contact with the reverse osmosis membrane under the conventional conditions used in reverse osmosis. The RO membrane may be operated under the application of a pressure of 0.5 to 1.5 MPa and at room temperature, that is, 20 to 30° C.

With respect to the amount of concentrate liquid to be separated by the RO membrane, it is preferable that the concentrate liquid be separated at a concentration ratio of 50 to 90 mass % of feed liquid. When the concentration ratio becomes higher than the above, the obtained concentrate liquid becomes viscous, so that the operating properties are worsened. When the concentration ratio becomes lower than the above, the concentration of the organic matter in the permeate liquid is increased, so that the recovery of the organic matter in the concentrate liquid cannot be efficiently achieved.

In the treatment of the reverse osmosis membrane, ultrafiltration (UF membrane) and microfiltration (MF membrane) can be employed as the pretreatments in the present invention.

EXAMPLES

The present invention will now be explained more specifically with reference to the following Examples, which are not intended to be limiting of the present invention. The samples used in each of the Examples were prepared in the manner shown below.

deacetylation ratio of 85%, estimated molecular weight of 2,300,000; and a viscosity of 213 mPa·s (0.5 mass % at 20° C.) was dissolved in 36 mass % hydrochloric acid in equal parts by mass, thereby preparing a 0.5 mass % solution.

Examples 1 to 4

One hundred gram of distillation waste (with a solid content of 5.4 mass %) generated from the manufacturing process of spirit distilled from sweet potatoes (Imo-Shochu) was placed into a 300-ml beaker. The stirrer was operated at 200 rpm. To 100 g of the distillation waste, the respectively specified amounts of sodium polyacrylate and chitosan were added successively in three steps to form a floc. The stirring was carried out for five minutes after the addition of each agent. After completion of the final stirring, the state of the floc was visually observed. Then, the whole floc was subjected to normal filtration by gravitation using a generally used qualitative filter paper No. 2. After 10 minutes, the amount of filtrate obtained was measured. The residues remaining on the filter paper were collected and the water content thereof was determined using a halogen moisture analyzer HR73 (made by Mettler Toledo). The results are shown in Table 1.

TABLE 1

| Ex. No. | First Agent and Amount (mg/kg) | Second Agent and Amount (mg/kg) | Third Agent and Amount (mg/kg) | State of Floc after Treatment (*) | Filtrate Amount after 10 min. (ml) | Water Content of Residues (%) |
|---|---|---|---|---|---|---|
| 1 | Sodium polyacrylate (50) | Chitosan (100) | Sodium polyacrylate (50) | ○ | 44 | 78.9 |
| 2 | Sodium polyacrylate (50) | Chitosan (100) | Sodium polyacrylate (100) | ○ | 46 | 77.1 |
| 3 | Sodium polyacrylate (100) | Chitosan (100) | Sodium polyacrylate (50) | ○ | 46 | 78.0 |
| 4 | Sodium polyacrylate (100) | Chitosan (100) | Sodium polyacrylate (100) | ○ | 50 | 75.0 |

(*) State of the floc obtained after addition treatment
○: A large floc was not viscous and not sticky. A solid and a liquid were satisfactorily separated from each other.
Δ: Although some effects were recognized, the floc was impractical because it remained viscous. Insufficient solid-liquid separation made the liquid material hazy.
X: High viscosity made solid-liquid separation difficult.

Sodium polyacrylate: Using a commercially available product "ARONFLOC TA-24" (made by MT AquaPolymer; Inc.) with a molecular weight of 8,000,000 and a viscosity of 450 mPa·s (in the form of a 0.10 mass % aqueous solution at 25° C.), a 0.2 mass % aqueous solution was prepared.

Chitosan: A commercially available product "Koyo Chitosan SK-200" (made by Koyo Chemical Co., Ltd.) with a

Comparative Examples 1 to 5

As specified in Table 2, the treatment of the same distillation waste as in Example 1 was carried out in the two steps in Comparative Examples 1 to 4, using the same agents as employed in Example 1. Comparative Example 5 did not use any additive agent. The results are shown in Table 2.

TABLE 2

| Comp. Ex. No. | First Agent and Amount (mg/kg) | Second Agent and Amount (mg/kg) | Third Agent and Amount (mg/kg) | State of Floc after Treatment (*) | Filtrate Amount after 10 min. (ml) | Water Content of Residues (%) |
|---|---|---|---|---|---|---|
| 1 | Chitosan (100) | Sodium polyacrylate (100) | | Δ | 32 | 85.7 |
| 2 | Chitosan (200) | Sodium polyacrylate (200) | | Δ | 36 | 86.1 |
| 3 | Sodium polyacrylate (100) | Chitosan (100) | | X | 30 | 88.5 |

TABLE 2-continued

| Comp. Ex. No. | First Agent and Amount (mg/kg) | Second Agent and Amount (mg/kg) | Third Agent and Amount (mg/kg) | State of Floc after Treatment (*) | Filtrate Amount after 10 min. (ml) | Water Content of Residues (%) |
|---|---|---|---|---|---|---|
| 4 | Sodium polyacrylate (200) | Chitosan (200) | | Δ | 32 | 85.3 |
| 5 | No addition | | | X | 18 | 92.5 |

Examples 5 to 9

The treatment was carried out in the same manner as employed in Example 1, using a distillation waste (with a solid content of 3.1 mass %) generated from the manufacturing process of bioethanol from corn. The results are shown in Table 3.

Sodium acrylate-acrylamide copolymer: Using a commercially available product "ARONFLOC A-166" (made by MT AquaPolymer, Inc.) with a molecular weight of 16,000,000 and a viscosity of 250 in mPa·s (in the form of a 0.10 mass % aqueous solution at 25° C.), a 0.2 mass % aqueous solution was prepared.

TABLE 3

| Ex. No. | First Agent and Amount (mg/kg) | Second Agent and Amount (mg/kg) | Third Agent and Amount (mg/kg) | State of Floc after Treatment (*) | Filtrate Amount after 10 min. (ml) | Water Content of Cake (%) |
|---|---|---|---|---|---|---|
| 5 | Sodium polyacrylate (25) | Chitosan (50) | Sodium polyacrylate (25) | ○ | 48 | 76.2 |
| 6 | Sodium polyacrylate (50) | Chitosan (50) | Sodium polyacrylate (50) | ○ | 50 | 74.1 |
| 7 | Sodium polyacrylate (25) | Chitosan (100) | Sodium polyacrylate (50) | ○ | 50 | 74.5 |
| 8 | Sodium polyacrylate (50) | Chitosan (100) | Sodium polyacrylate (25) | ○ | 51 | 74.0 |
| 9 | Sodium polyacrylate (50) | Chitosan (100) | Sodium polyacrylate (50) | ○ | 54 | 73.0 |

Comparative Examples 6 to 10

In Comparative Examples 6 to 9 the treatment was carried out in the three steps in the same manner as employed in

TABLE 4

| Comp. Ex. No. | First Agent and Amount (mg/kg) | Second Agent and Amount (mg/kg) | Third Agent and Amount (mg/kg) | State of Floc after Treatment (*) | Filtrate Amount after 10 min. (ml) | Water Content of Cake (%) |
|---|---|---|---|---|---|---|
| 6 | Sodium acrylate acrylamide copolymer (100) | Chitosan (50) | Sodium poly-acrylate - acrylamide copolymer (100) | X | 34 | 87.7 |
| 7 | Sodium polyacrylate acrylamide copolymer (100) | Chitosan (100) | Sodium poly-acrylate - acrylamide copolymer (100) | X | 34 | 87.0 |
| 8 | Sodium polyacrylate (100) | Acrylic cationic polymer coagulant (50) | Sodium polyacrylate (100) | Δ | 38 | 85.1 |
| 9 | Acrylic cationic polymer coagulant (50) | Sodium acrylate acrylamide copolymer (100) | Acrylic cationic polymer coagulant (100) | X | 30 | 90.5 |
| 10 | No addition | | | X | 26 | 94.4 |

Example 5 except that an acrylic-based cationic polymer coagulant and a sodium acrylate-acrylamide copolymer based anionic polymer coagulant were employed as specified in Table 4. The samples used in those Comparative Examples were prepared in such a manner as mentioned below. Comparative Example 10 did not use any additive agent. The results are shown in Table 4.

Acrylic-based cationic polymer coagulant: Using a commercially available product "ARONFLOC C-508" (made by MT AquaPolymer, Inc.) with a molecular weight of 9,000,000 and a viscosity of 1100 mPa·s (in the form of a 0.30 mass % aqueous solution at 25° C.), a 0.2 mass % aqueous solution was prepared.

As is apparent from Tables 1 to 4, it is found that the successive addition of sodium polyacrylate, chitosan, and sodium polyacrylate in that order can form a good floc, which indicates the improved efficiency of solid-liquid separation.

Example 10

Using the filtrate obtained by solid-liquid separation according to the present invention, the effects of the treatment by reverse osmosis membrane were examined. One kilogram of the distillation waste (with a solid content of 5.4 mass %) generated from the manufacturing process of spirit distilled from sweet potatoes (Imo-Shochu) as employed in Example 1 was placed into a 3-1 beaker. The stirrer was operated at 200 rpm. To the distillation waste, sodium polyacrylate for use in the present invention was added in an amount of 100 mg/kg, followed by stirring for 5 minutes, and then chitosan for use in the present invention was added in an amount of 100 mg/kg, followed by stirring for 5 minutes, and finally sodium polyacrylate was added in an amount of 100 mg/kg, followed by stirring for 5 minutes. Thus, a floc was formed. Then, the whole floc was subjected to normal filtration by gravitation using a generally used qualitative filter paper No. 2. The resultant filtrate showed the following properties: pH of 4.18, electrical conductivity of 3,090 µS/cm, and COD of 8,500 mg/L.

500 ml of the filtrate was caused to pass through a flat sheet type pressure cell with a reverse osmosis membrane (having a membrane area of 32 cm$^2$) at a pressure of 1.0 MPa and room temperatures. A cellulose acetate membrane (manufactured by GE Infrastructure Water & Process Technology) was employed as the reverse osmosis membrane. The operation yielded 100 ml of concentrate and 400 ml of permeate. The concentrate showed the following properties: pH of 4.08, electrical conductivity of 15,400 µS/cm, and COD of 42,000 mg/L. The permeate showed the following properties: pH of 4.03, electrical conductivity of 620 µS/cm, and COD of 1,700 mg/L. The organic matter was satisfactorily recovered and the permeate became purified.

Example 11

The effects of the treatment by reverse osmosis membrane were examined in the same manner as in Example 10. One kilogram of the distillation waste (with a solid content of 3.1 mass %) generated from the manufacturing process of bioethanol from corn as employed in Examples 5 to 9 was placed into a 3-1 beaker. The stirrer was operated at 200 rpm. To the distillation waste, sodium polyacrylate for use in the present invention was added in an amount of 50 mg/kg, followed by stirring for 5 minutes, and then chitosan was added in an amount of 100 mg/kg, followed by stirring for 5 minutes, and finally sodium polyacrylate was added in an amount of 50 mg/kg, followed by stirring for 5 minutes. Thus, a floc was formed. Then, the whole floc was subjected to normal filtration by gravitation using a generally used qualitative filter paper No. 2. The resultant filtrate showed the following properties: pH of 4.20, electrical conductivity of 1,450 µS/cm, and COD of 3,800 mg/L.

500 ml of the filtrate was caused to pass through a flat sheet type pressure cell with a reverse osmosis membrane (having a membrane area of 32 cm$^2$) at a pressure of 1.0 MPa and room temperatures. Used as the reverse osmosis membrane was a polyamide composite membrane (manufactured by DowFilmtec). The operation yielded 50 ml of concentrate and 450 ml of permeate. The concentrate showed the following properties: pH of 4.28, electrical conductivity of 14,000 µS/cm, and COD of 37,000 mg/L. The permeate showed the following properties: pH of 4.08, electrical conductivity of 150 µS/cm, and COD of 390 mg/L. The organic matter was satisfactorily recovered and the permeate became purified.

What is claimed is:

1. A method for treating distillation waste from starchy materials, comprising the steps of:
    adding sodium polyacrylate to treat the distillation waste,
    adding chitosan to treat the distillation waste treated in the first step, and
    adding sodium polyacrylate to treat the distillation waste treated in the second step.

2. The method of claim 1, wherein the sodium polyacrylate is added in an amount of 10 to 1000 mg/kg individually in the first step and the third step, and the chitosan is added in an amount of 10 to 1000 mg/kg in the second step.

3. The method of claim 1, further comprising the steps of carrying out solid-liquid separation after the addition of sodium polyacrylate in the third step, and thereafter bringing a liquid material separated by the solid-liquid separation into contact with a reverse osmosis membrane.

4. The method of claim 1, wherein the sodium polyacrylate used in the first step and the third step each has a weight-average molecular weight of 1,000,000 or greater.

5. The method of claim 1, wherein the chitosan used in the second step has a weight-average molecular weight of 1,000,000 or greater.

6. The method of claim 1, wherein the distillation waste from starchy materials is distillation waste of Japanese distilled spirits (shochu) or distillation waste generated from the manufacturing process of bioethanol for fuel.

7. A method for producing distillation waste having a reduced amount of water from starchy materials, comprising the steps of:
    adding sodium polyacrylate to treat the distillation waste,
    adding chitosan to treat the distillation waste treated in the first step, and
    adding sodium polyacrylate to treat the distillation waste treated in the second step to obtain the distillation waste having a reduced amount of water.

8. The method of claim 7, wherein the sodium polyacrylate is added in an amount of 10 to 1000 mg/kg individually in the first step and the third step, and the chitosan is added in an amount of 10 to 1000 mg/kg in the second step.

9. The method of claim 7, farther comprising the steps of carrying out solid-liquid separation after the addition of sodium polyacrylate in the third step, and thereafter obtaining a solid material separated by the solid-liquid separation.

10. The method of claim 7, wherein the sodium polyacrylate used in the first step and the third step each has a weight-average molecular weight of 1,000,000 or greater.

11. The method of claim 7, wherein the chitosan used in the second step has a weight-average molecular weight of 1,000,000 or greater.

12. The method of claim 7, wherein the distillation waste from starchy materials is distillation waste of Japanese distilled spirits (shochu) or distillation waste generated from the manufacturing process of bioethanol for fuel.

13. The method of claim 7, wherein the distillation waste obtained has a water content of 80% or less.

* * * * *